US005717593A

United States Patent [19]
Gvili

[11] Patent Number: 5,717,593
[45] Date of Patent: Feb. 10, 1998

[54] LANE GUIDANCE SYSTEM

[76] Inventor: Michael E. Gvili, 18 Loblolly La., Wayland, Mass. 01778

[21] Appl. No.: 523,082

[22] Filed: Sep. 1, 1995

[51] Int. Cl.$^6$ .................................................. G05D 1/00
[52] U.S. Cl. ........................................ 364/449.1; 364/457
[58] Field of Search .......................... 364/449.1, 449.95, 364/449.8, 454, 457, 427, 428, 429, 424.025; 340/947, 948, 953, 958, 973

[56] References Cited

U.S. PATENT DOCUMENTS

| | | | |
|---|---|---|---|
| 3,577,120 | 5/1971 | Sherbert, Jr. | 340/27 |
| 3,643,258 | 2/1972 | Balding | 343/108 R |
| 3,696,671 | 10/1972 | Steigleder et al. | 73/178 R |
| 3,711,826 | 1/1973 | La Russa | 340/27 NA |
| 3,784,969 | 1/1974 | Wilckens et al. | 340/27 NA |
| 3,918,662 | 11/1975 | Vircks et al. | 244/77 A |
| 4,040,005 | 8/1977 | Melvin | 340/27 AT |
| 4,149,148 | 4/1979 | Miller et al. | 340/721 |
| 4,198,654 | 4/1980 | Coulomb | 358/109 |
| 4,247,843 | 1/1981 | Miller et al. | 340/27 NA |
| 4,283,705 | 8/1981 | James et al. | 340/27 NA |
| 4,299,483 | 11/1981 | Grove et al. | 340/947 |
| 4,313,726 | 2/1982 | Chase | 434/42 |
| 4,368,517 | 1/1983 | Lovering | 364/428 |
| 4,454,510 | 6/1984 | Crow | 343/5 GC |
| 4,482,961 | 11/1984 | Kilner et al. | 364/428 |
| 4,554,545 | 11/1985 | Lowe | 340/980 |
| 4,972,321 | 11/1990 | Kahler | 364/428 |
| 5,235,513 | 8/1993 | Velger et al. | 364/449 |
| 5,289,185 | 2/1994 | Ramier et al. | 340/971 |
| 5,343,395 | 8/1994 | Watts | 364/428 |
| 5,593,114 | 1/1997 | Ruhl | 244/183 |

OTHER PUBLICATIONS

"Spraying By Satellite" P68+, vol. 21, No. 10, Nov./Dec. 1994 Issue Of Agriculture Aviation.
Sales Brochure—Precision Electronics Guidance Sys 947 Chudalla Rd. Wharton TX 77488 (Date Unknown).
Sales Brochure—Satloc, Airstar, Tempe AZ 85282 (Undated).
Trimble Trim Flight Tech Overview.
Trimble Trim Flight GPS Aeriol Guidance System.

*Primary Examiner*—Kevin J. Teska
*Assistant Examiner*—Stephen J. Walder, Jr.
*Attorney, Agent, or Firm*—Vernon C. Maine

[57] ABSTRACT

A method and apparatus for continuously prompting a pilot to manually control and guide a vehicle along a selected line segment of a pattern of coverage of a target area. An on-board receiver and computer receives navigation reference signals, computes navigation parameters and generates navigation signals to an indicator. The indicator is placed within the normal forward field of outside vision of the vehicle's pilot. In a virtual flagman mode, the indicator has lower and upper horizontal lightbars on which discreet lights are illuminated to the left or right of the centerpoint to simulate the relative lateral position of actual flagmen at the beginning and end points of the line segment being tracked. In a flight director mode, the indicator shows a composite sum of factored navigation parameters including angle of intercept between the line segment and vehicle track, perpendicular distance of the vehicle from the line segment, and rate of turn of the vehicle, as a control instruction to the pilot. The system may include audible tone or voice prompts as well.

20 Claims, 6 Drawing Sheets

FIG. 7B

LANE GUIDANCE SYSTEM

BACKGROUND OF THE INVENTION

1. Field of the Invention

This invention relates most generally to on-board navigation and guidance systems for piloted vehicles.

More particularly, this invention relates on-board course line guidance systems which provide visual prompts to the pilot for necessary control inputs to acquire and maintain alignment of the vehicle to the desired lane or line segment, wherein the pilot is required to maintain nearly constant outside vigilance of the subject terrain.

2. Description of the Prior Art

There are many reasons for systematically traversing the entire area of a defined section of land, water, seabed, air space, or even lunar surface. Search, survey, photo-survey, fire-fighting, and agricultural spraying are a few. Close adherence to the lanes or lines of the selected pattern are necessary to assure full and effective coverage of the target area.

Such operations may be conducted on foot or by vehicle. Working vehicles for such operations may include boats, planes, tractors, bicycles, helicopters, spacecraft or other specialized or multi-medium vehicles suitable for the work.

The agricultural industry has long used land-based vehicles and aircraft for spraying fields with supplemental chemicals to protect crops and enhance productivity.

Typically, a mission plan and application pattern is devised or selected by the vehicle operator which takes into account the distance of the parcel from a staging site, size and configuration of the parcel, width of a lane that can be effectively covered in a normal pass by the applicator or spray vehicle, the room needed for turns at the perimeter of the parcel, and the endurance and payload capacity of the spray vehicle.

One of the challenges to efficient execution of the spray pattern is lane control, that is, marking and guiding the vehicle precisely along the lanes of the pattern to reduce voids and oversprays between lanes and along the perimeter of the parcel. Land vehicles may in some cases be able to cover the parcel effectively by traversing existing cultivation lines, but in many cases this method of lane control is not available or not the most efficient application pattern.

Aerial vehicles are widely used for spraying because they travel at higher speeds, and can generally get the job done quicker. However, the higher speeds, distance from the ground and wider turns of aerial vehicles makes following existing cultivation lines impractical for aerial vehicles, too.

Traditional means for specifically marking spray lanes have included physical markers and/or flagman. One flagman at the near end of the field or parcel for the starting point of the lane, and one at the end point of the lane. This method, still widely practiced in some areas, requires several workers and still leaves the track of the spray vehicle between end points subject to drifting side to side, without a clear indication or record of the occurrence or extent of voids or overspray.

The recent development of satellite navigation has provided an important new tool to the precision application of agricultural chemicals, as well as to other large-scale spraying and pattern-dependent operations. This excerpt from an article entitled, "Spraying by Satellite," page 8, Volume 21 No. 10, November/December 1994, Agricultural Aviation, published by the National Agricultural Aviation Association, provides further context for a continuing description of the prior art:

"In the agricultural aviation industry, Global Positioning Systems (GPS) are rapidly changing the way that aerial applicators apply crop protection chemicals and fertilizers, or even fight forest fires. Linked to a PC computer, GPS systems allow pilots to apply chemicals or fertilizers with pinpoint accuracy, virtually eliminating swath skips or oversprays. GPS technology now allows spray pilots to make prescription applications to target areas which adjoin buffer zones along waterways, within environmentally-sensitive areas, have no straight-line boundaries (such as center pivot irrigation circles or forested areas), or even near residential areas.

"There are significant economic and human safety benefits as well. GPS systems may well make the use of human flaggers obsolete in the next few years, minimizing concerns for related pesticide exposure and reducing costs for personnel, vehicles, and project coordination. what's more, pinpoint application of materials to precise target sites has been proven to reduce both application time and use of spray materials.

"At the core of GPS technology is a constellation of 24 operational GPS satellites placed in polar orbit by the U.S. government over the past 14 years. These satellites continuously transmit precisely-timed radio signals. A GPS receiver calculates distances to at least three or more of the satellites by calculating the travel time of the signals, then triangulates distances to a number of additional satellites to calculate the GPS receiver's longitude, latitude, and altitude.

"Used alone, an onboard GPS receiver can identify aircraft position to within about 300 feet. To further refine the system accuracy, manufacturers have developed Differential GPS (DGPS). This system uses a stationary GPS receiver located on the ground to transmit error corrections to the onboard GPS receiver. Using differential correction, agricultural pilots can pinpoint aircraft location to within 3 feet or less of precise location when the onboard receiver receives updates at a rate of 5 times per second.

"There are a variety of methods to attain differential correction. Some manufacturers offer an optional stationary GPS receiver which provides corrections to the onboard GPS system. Some companies have developed their own networks of UHF differential transmission towers in the U.S. and abroad, and sell that service for an annual fee. An FM transmission network is now under expansion in the U.S. which also provides differential correction signals for a fee. The U.S. Coast Guard and Army Corps of Engineers are now in the process of expanding the Coast Guard 300 kilohertz system, a free source of differential signals. This system is expected to cover the eastern U.S. within the next year, and will ultimately cover the entire United States.

"Standard GPS features for the agricultural aviation industry include an onboard GPS receiver and power supply, a lightbar which provides pilot guidance during operation (applicant's italics), and a cockpit module which displays a variety of data. In addition, there are a number of options now available, ranging from GPS base stations which generate and transmit differential corrections; to onboard moving map displays which depict flight lines, topographical features, blocks, and other operational information in real time."

There is an ergonomic challenge to presenting electronic navigation and lane guidance data to the vehicle operator in real time, particularly in high speed vehicles such as aircraft where constant outside vigilance is required to fly the aircraft in close proximity to the ground. The information must be presented in such a way as to allow the operator to understand and respond in a timely fashion to lateral prompts while maintaining a vertically close yet safe proximity to the ground and other obstacles.

Different Agricultural DGPS manufacturers have resorted to various schemes for displaying the information, many having a cockpit display which might be a moving map screen, and a dash-mounted lightbar as a primary or supplemental display which provides lane guidance cues within the pilot's "heads up" range of forward, outside vision.

Many of the lightbars used in these applications are configured as a single row of light-emitting diodes (LEDs) or similar lights which are operated in such a way as to indicate general direction and magnitude of courseline corrections as a lightbar extending to the left or right of center. However, there is no specific correlation between the fore and aft markers or flagmen that the operator would see outside the aircraft, and the display on the indicator.

Some manufacturers are known to use lightbars with two rows of lights or LEDs, one row indicating angular displacement, and the other indicating linear displacement, from the desired lane centerline or courseline. Again, there is no specific correlation between the two flagmen on the ground, and the electronic display.

A further problem with the prior art of vehicle or cockpit indicators is that operators in this line of work, particularly pilots, must keep an extremely vigilant outlook at the target area for safety reasons as well as precision. The indicators of the prior art are either down in the cockpit, requiring the operator to look down, or are an obstacle to full forward vision if mounted within his or her forward, outside line of sight.

The broad problem, then, not resolved by the prior art of lane guidance systems is the difference between the visual array or presentation on the electronic display, and what the vehicle operator would see if he were viewing actual on-site markers or flagmen on each side of the target area, marking the entry or intercept point and the end or departure point of successive lanes on consecutive passes over the target area during the operation.

Alternatively stated, it is not clear what composite form of navigation parameters or lane guidance prompts might be most readily interpreted and easily responded to by the pilot in order to acquire and maintain alignment of the vehicle's track with the desired line segment.

It will be apparent to even the uninitiated that the less interpretation of electronic representations the vehicle operator is required to mentally process, the quicker and closer he or she will be able to acquire and maintain the desired courseline across the parcel. Furthermore, the less of an obstacle such electronic indicators are to the pilot's outside forward line of sight, the safer the mission can be conducted.

SUMMARY OF THE INVENTION

The main purpose of the invention is to provide a lane guidance navigation system on board a piloted vehicle that will remove the pilot's dependency actual markers of some sort being placed on the line segment to be traversed, and prompt the pilot with visual displays to take the necessary control actions to closely align the vehicle track with the intended line segment.

One object of the invention is to provide a lane guidance system that will simulate the traditional flagmen at the beginning and end of a selected lane to be traversed, on an indicator located within the pilot's normal field of forward outside vision.

Another object is to provide a lane guidance system that will calculate a composite or factored sum of navigational parameters relating to the line segment and vehicle track, and present the sum as a visual prompt for necessary control actions on an indicator located within the pilot's normal field of forward outside vision.

Yet another object is to enable the pilot to choose between the simulated flagmen presentation and the factored sum for presentation on the indicator.

Still yet another object of the invention is to enable the pilot to choose concurrent variations of the factored sum presentation, such as may provide the optimum indication of necessary control actions for that pilot and vehicle combination.

A further object of the invention is to project the display of the visual prompt for corrective action into the pilot's normal field of forward outside vision without blocking any portion of his or her field of vision with hardware.

Yet another further object is to provide the indicator with alphanumeric message capability.

Still yet another further object of the invention is to configure variations of the system to be applicable to different airborne, land-based, seaborne or multi-medium vehicles.

An additional object of the invention is to disclose methodologies for exercising the invention and variations thereof.

Still other objects and advantages of the present invention will become readily apparent to those skilled in this art from the following detailed description, wherein I have shown and described preferred and other embodiments of the invention, simply by way of illustration of the best mode contemplated by me on carrying out the invention. As will be realized, the invention is capable of other and different embodiments, and its several details are capable of modifications in various obvious respects, all without departing from the invention.

BRIEF DESCRIPTION OF THE DRAWINGS

FIG. 7 is a side view diagram of the heads-up display of one embodiment, shown as if roof-mounted in FIG. 7A, and as if dash-mounted in FIG. 7B.

DESCRIPTION OF THE PREFERRED EMBODIMENT

Simply put, the invention is a lane guidance system for providing visual prompts to a pilot for guiding a vehicle to an intercept position or first point on a line segment and then along the line segment to a departure point or second point. To those skilled in the art, however, the invention admits of many variations.

For example, one embodiment of the system has at least one antenna and receiver for receiving navigation reference signals such as differential global positioning system signals. Other permanent or temporary navigation reference signal sources which provide sufficient accuracy and resolution could be used.

Also, the system has a computer and control panel that would have or be programmed or otherwise provided with navigation data sufficient to identify and relate the position of the first and second points to the position and track of the vehicle. It may have the entire plot plan for the mission target, which could then be resolved into an efficient pattern of lane coverage for the mission and type of vehicle being used. The control panel may include a graphic display capability that can show the plot plan, a moving map display, or other variations of the navigational situation in real time.

The computer then continuously calculates the navigation parameters and transmits lane guidance signals to a guidance indicator made up of one or two horizontal lightbars and positioned within the pilot's normal field of forward outside vision. Each lightbar consists of a line of discrete, individually illuminatable lamps or light emitting diodes, which are able to be turned on or made visible so as to light up to the left or right of the centerpoint as a "bar" of light in direction and length as affected or controlled by the lane guidance signals from the computer, or as a "point" of light displaced in direction and distance from the centerpoint as controlled by the signals from the computer. The centerpoint may be accentuated by a slightly displaced light in the lightbar, or by other common means.

One embodiment includes a virtual flagmen mode, where a single, discrete light on the upper lightbar simulates the relative lateral displacement or location of an actual flagman on the far end or second point on the lane or line segment, as compared to the heading and location of the vehicle, and a single, discrete light one the lower lightbar simulates the relative lateral displacement or location of a flagman or marker at the near end of the lane or line segment.

The signal for the lower lightbar is created by displacing a first point some distance rearward of the vehicle on it's extended track, calculating the lateral distance from that point to the extended line segment, and scaling it to fit the lightbar with the desired sensitivity and range.

The signal for the upper lightbar is similarly created by displacing a second point some distance ahead or forward of the vehicle on it's extended track and calculating the lateral distance from that point to the extended line segment.

Adjusting the displacement of either or both of the displaced points, provides a means to adjust the sensitivity of the virtual flagman mode. With this indication presented within his forward, outside field of view, the pilot can then readily perceive the vehicle's heading and orientation relative to the electronically simulated flagmen and make the necessary control actions to acquire and maintain alignment of the vehicle's track with the line segment, while maintaining a safe, heads-up vigilance outside and ahead of the moving vehicle.

As another example, a similar embodiment of the invention employs a flight director mode, which calculates navigation parameters including the angle of intercept between the line segment and the actual track of the vehicle, the perpendicular distance of the vehicle from the line segment, and the rate of turn of the vehicle. Factoring each of these parameters by a respective index, and summing the result, a composite guidance signal is presented or displayed on the indicator as a pilot instruction prompting corrective control action by the pilot, again without the pilot having to look away from his or her normal field of forward outside vision.

The magnitude and direction of the guidance signal or indication displayed, in other words the number of lights or the length of the lightbar illuminated to the left or right of center, is a function of the primary equation:

$$FD = aCDI + bAOI + cROT,$$

where FD is the flight director output signal to the indicator, CDI is the course deviation indicated as the perpendicular distance of the aircraft from the extended line segment, AOI is the angle of intercept of the aircraft's ground track and the swath line, and ROT is the rate of turn of the aircraft. The respective "a", "b" and "c" indexes are set to provide the optimal visual composite prompt to the pilot for manual response and control of the particular vehicle.

Assuming the vehicle to be an aircraft, an illustration of the flight director calculation might be as follows; the aircraft is displaced 20 feet to the right of the intended swath line or lane, it's ground track being at an intercept angle of 10 degrees to the lane, with an instant rate of turn of zero. Using indexes of a=0.4, b=0.5, and c=0.2, the flight director output is calculated as 13 units or lights, prompting the pilot for left stick or aileron deflection for a left bank.

As the pilot responds by banking the aircraft left, the aircraft rotates to the left in it's ground plane and the computer calculates a left turn at a rate of, say, 20 degrees per second. Since the direction of the turn is negative relative to the angle of intercept, it reduces the flight director output by 4 units to 9, thus dynamically prompting the pilot to reduce the degree of left bank a corresponding amount. As the aircraft approaches proper alignment with the line segment or lane, reducing the CDI, the stick prompt magnitude is likewise further reduced.

The indexes or weights of each of the three variables can be varied or even set to zero to alter the characteristics of the display to suit the pilot. For example, setting "b" and "c" to zero would yield a corrective prompt based solely on course deviation.

Additionally, the two rows of lightbars can display alternate variations of the basic formula, providing the pilot with a further means for refining the displayed prompts for easiest interpretation and best results.

As yet another example, the system may be capable of both the virtual flagmen mode and the flight director mode, the choice between them being pilot-selectable via the control panel on the computer.

As still yet another example, the system may provide a further navigation signal output, analog or digital, for an autopilot for automated lateral control of the vehicle. Such autopilot lane control might be pilot-engaged by a pressure switch on the control yoke or stick, which upon release is disengaged.

As even still yet another example, when using the flight director mode with a multiple lightbar indicator, the pilot or system setup operator can program the computer to use a different set of indexes for calculating the sum for each lightbar. In this fashion, one prompt can be a more sensitive or accelerated prompt by devaluing, for example, the angle of intercept. This provides the pilot with an adjustable range of suggested control input between a more sensitive prompt on one lightbar and a less sensitive prompt on another lightbar.

As an additional example of the invention, the indicator may be a heads up display arranged on the glareshield or dashboard where the navigation signals are superimposed on a transparent image splitter in the pilot's normal field of forward outside vision.

As yet another additional example, the pilot's lane guidance indicator may include a row or more of alphanumeric capability, such as necessary to post the control prompt in text or coded numbers, a lane number, elapsed time, distance or time to go to the first or second point, or other information of real-time importance to the pilot.

As still yet another additional example, the vehicle could be an airplane, helicopter, tractor, truck, boat, submarine, space vehicle, or any other airborne, land-based, sea-borne, or multi-medium vehicle.

As a further example, the system may incorporate concurrent, supplemental audible or audio navigation signals such as varying tones, to indicate degree of non-alignment, or actual voice prompts to the pilot, such as "left, left" and "right, right", corresponding to the visual prompts.

As another further example, the invention may be practiced by any of the methodologies expressed or implied in this disclosure, including the appended claims and any of the above examples.

The following is merely a description of a preferred embodiment of the invention, a lane guidance navigation system that provides enroute navigational features and functions, and also has capabilities for visually and aurally prompting a pilot to make necessary control action inputs to an agricultural aircraft to acquire and maintain alignment of the ground track of the aircraft with the consecutive lanes or line segments of a parallel line pattern configured to fit a plot plan of the field being covered.

Figure 1:
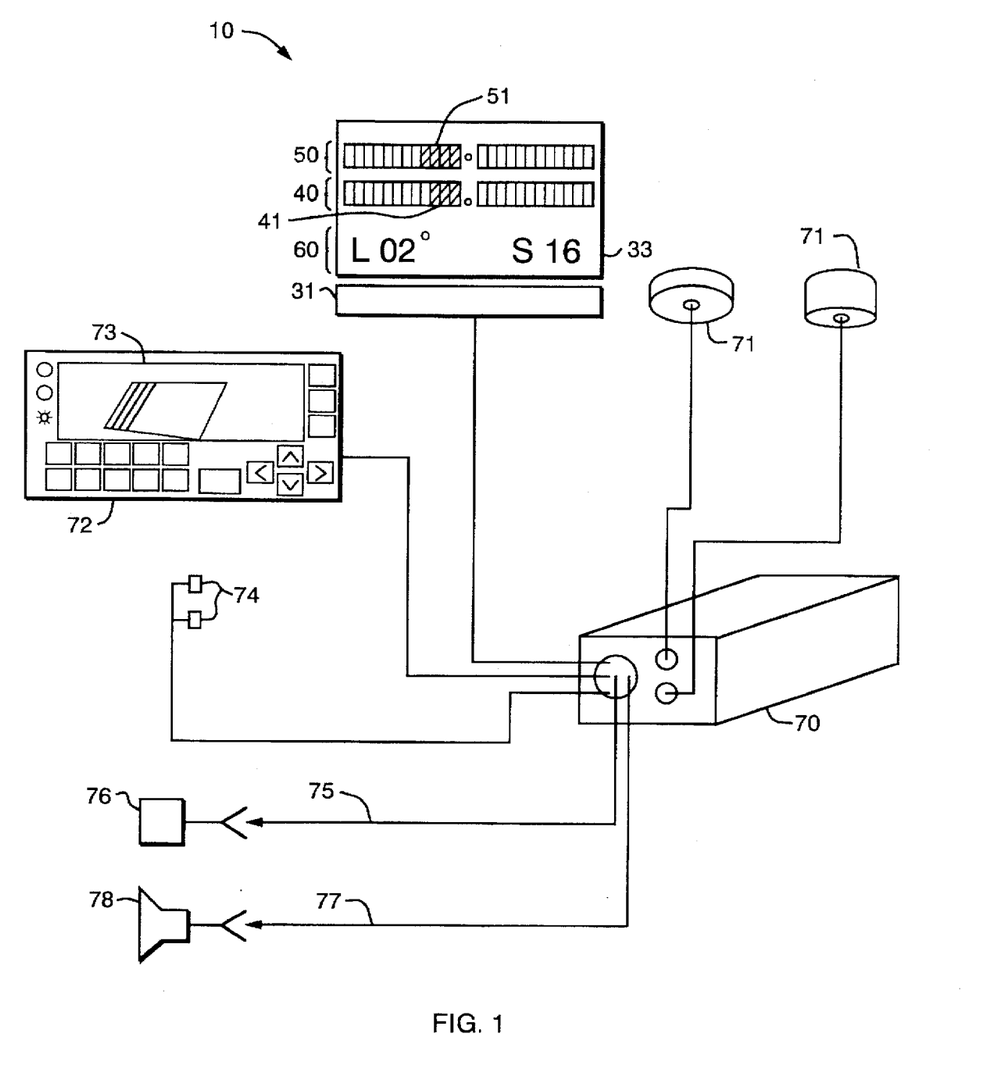
FIG. 1 is a simplified system diagram of a preferred embodiment of the invention.

Referring now to FIG. 1, the system consists of a navigation and lane guidance computer 70 with antennas 71, control panel 72 with moving map display 73, sensors 74 to monitor the aircraft's dispenser system, an autopilot output 75 for optional autopilot 76, an audio output 77 to an optional speaker 78, and lightbars 40 and 50 presented on a heads-up display indicator 10 located on the glareshield in the pilot's line of sight out the front of the aircraft.

Figure 2A:
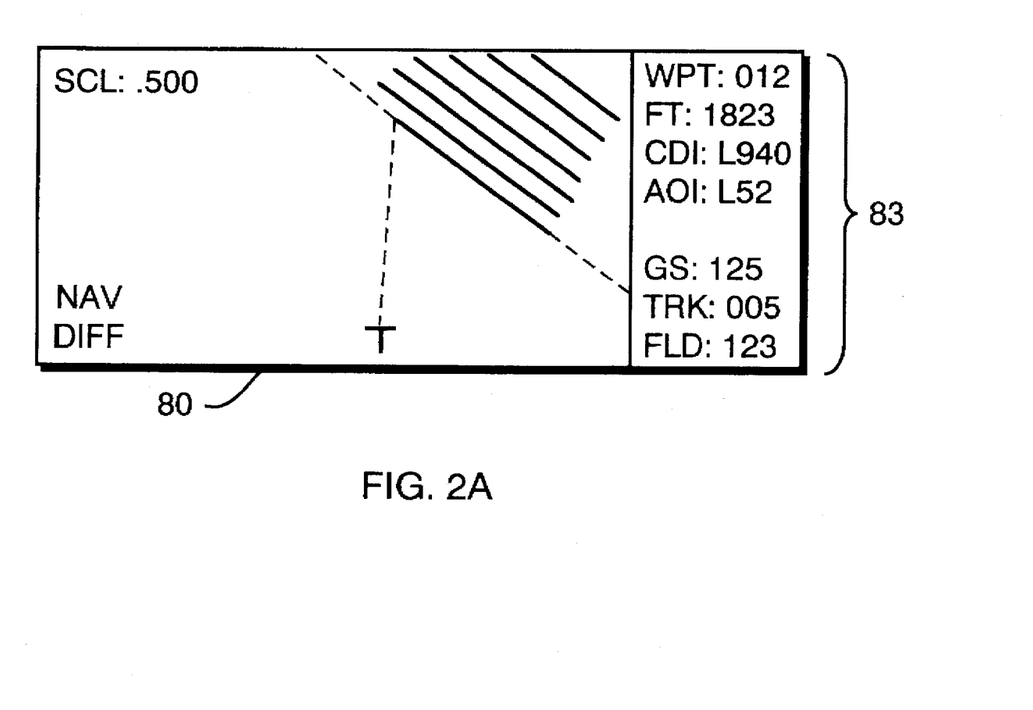
FIG. 2 illustrates two examples of the navigation information available on the moving map display of the invention.
Figure 2B:
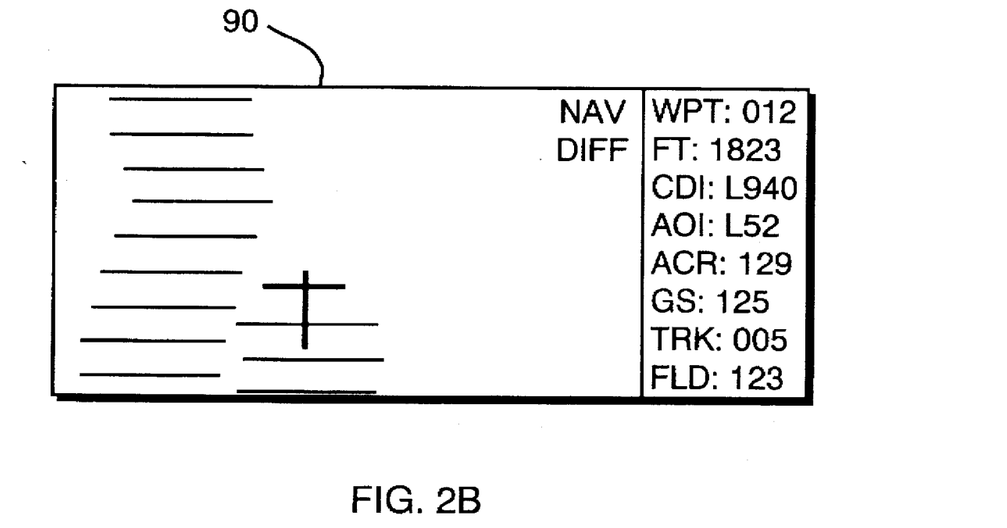

Referring to FIG. 2, the navigation and lane guidance computer 70 is programmed for the desired target area and staging site, and optionally with the endurance of the aircraft's fuel supply and applicator system. The computer 70 resolves the geographical shape of the target area into an efficient aerial application pattern as depicted on map display 80, and provides navigational guidance to and from the staging site as well as solutions for pattern entry and re-entry on subsequent cycles from the staging site. Alphanumeric data 83 relating to navigation parameters is also included in map display 80. The audio output 77 consists of word prompts including the words "left" and "right".

Computer 70 alternatively provides real-time swath coverage as depicted on map display 90, while the aircraft is actually flying the lane.

Patterns may be saved in computer 70 for reuse, and previously flown patterns may be reprogrammed or recalled from memory and used for subsequent missions.

The computer 70 receives radio navigation signals from external sources during the operation; in this instance, Global Positioning System (GPS) signals and differential corrections.

Referring now to FIGS. 3, 4, 5 and 6, discrete, illuminatable lights running to the left or right of center on lightbars 40 and 50 of indicator 10 generally depict angular alignment and lateral displacement of the aircraft's ground track T from lane L of the pattern for coverage.

Figure 3:
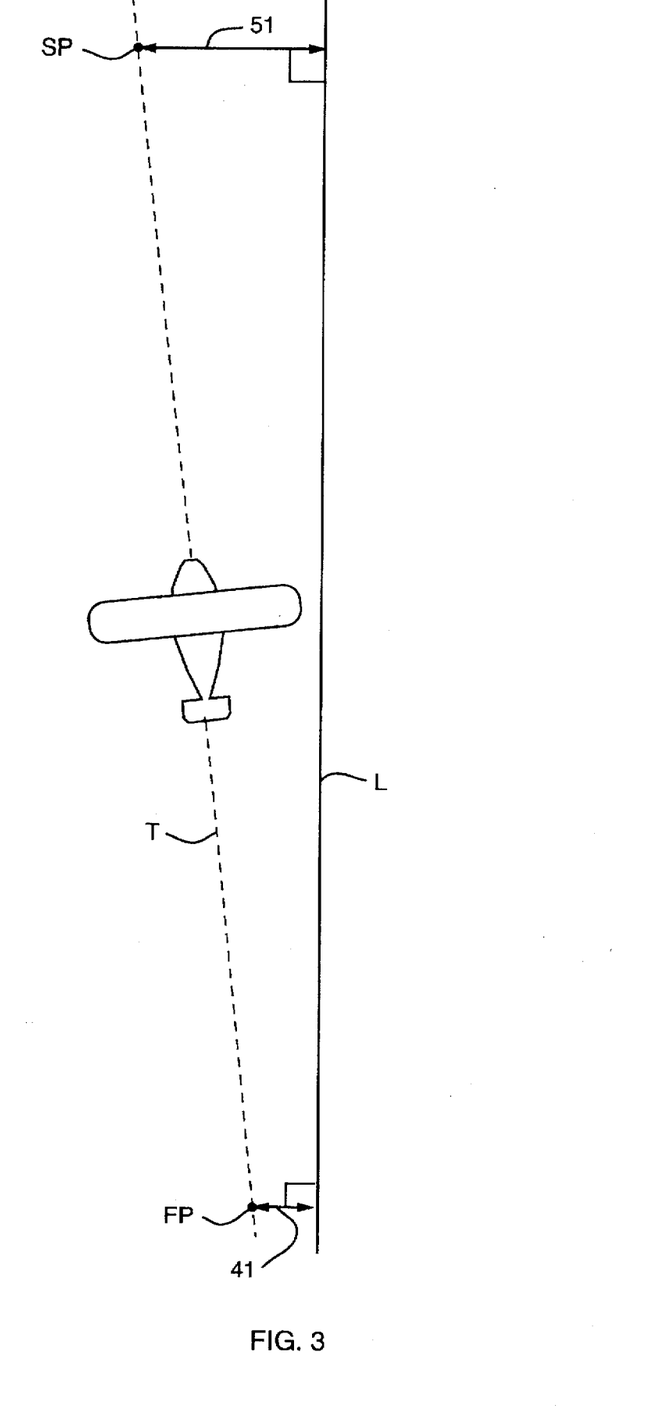
FIG. 3 is a diagram depicting the navigational plot used to resolve the navigation parameters and generate the virtual flagmen mode signal for pilot guidance shown on the indicator of FIG. 4.
Figure 4:
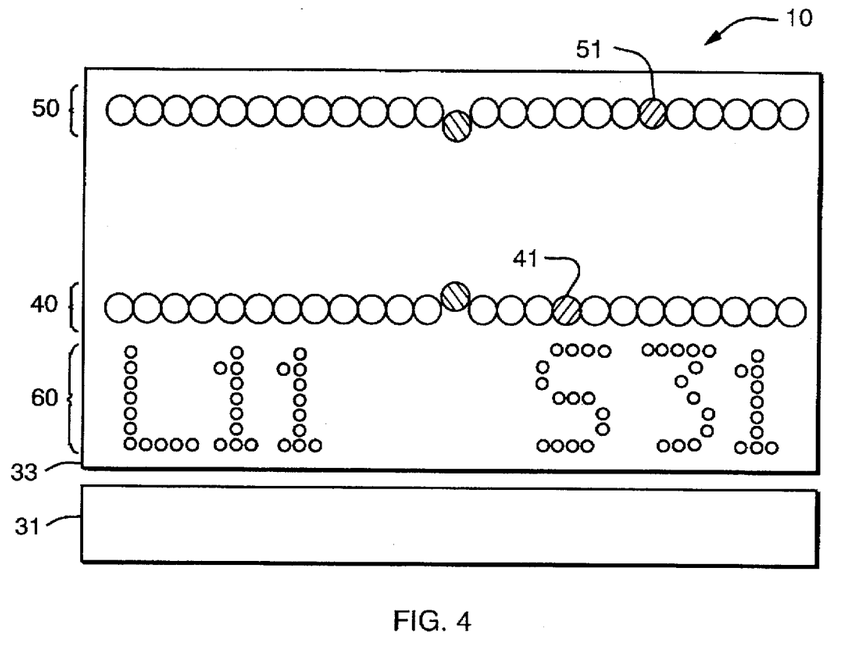
FIG. 4 is a representation of the indicator in the virtual flagmen mode, simulating the relative lateral placement of traditional flagmen for the line segment of FIG. 3.

Referring specifically to FIGS. 3 and 4, in the "virtual flagman" mode the perpendicular distance 41 from lane L of a first point FP displaced some distance to the rear of the aircraft on it's extended track T is presented as a single discrete light 41 on lower lightbar 40 of indicator 10, and a second point SP displaced some distance forward of the aircraft on it's extended track T, is presented as a single, discrete light 51 on upper lightbar 50 of indicator 50, thus simulating the relative position of the flagmen that would be standing at the beginning and end of the line segment or lane L, and indicating to the pilot what direction and degree of corrective action is required to correct the alignment.

Figure 5A:
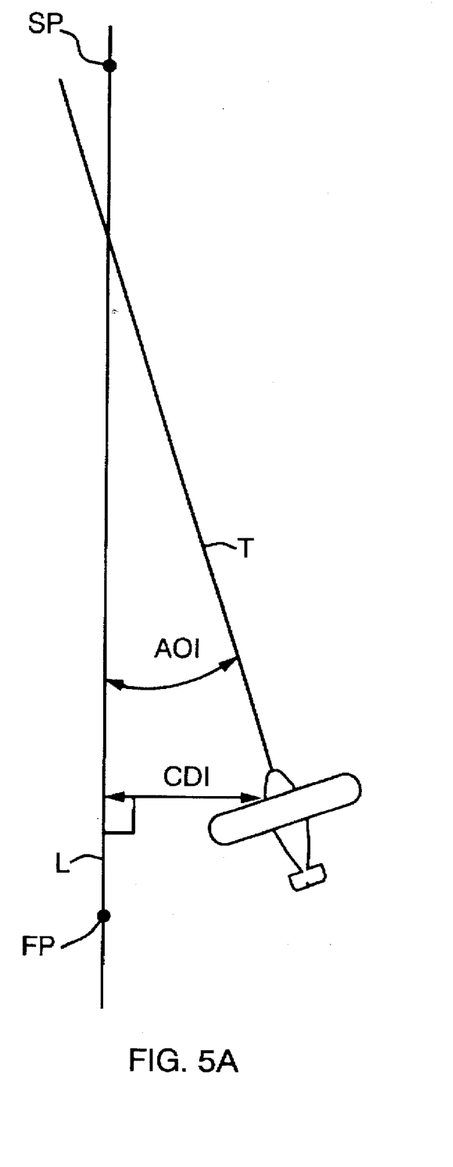
FIG. 5 is a pair of diagrams depicting the navigational plots used to resolve the navigation parameters and generate the flight director signal for pilot guidance shown on the indicator of FIG. 6.
Figure 5B:
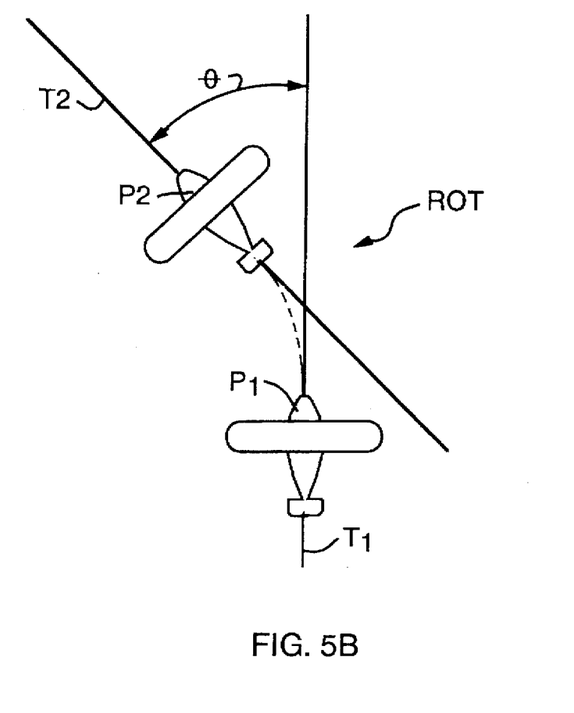
Figure 6:
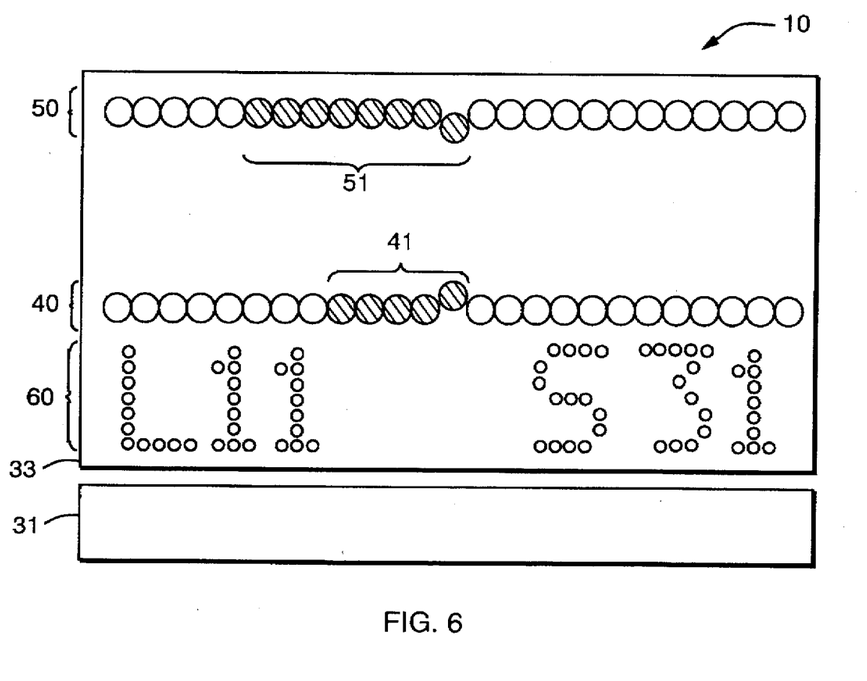
FIG. 6 is a representation of the indicator in the flight director mode, with bars of light extending outward from the centerpoint, indicating the direction and extent of correction needed.

Referring specifically now to FIGS. 5 and 6, in the "flight director" mode the computer 70 resolves the angle of intercept AOI between lane L and track T, perpendicular distance CDI of the aircraft from the lane L, and the rate of turn ROT of the aircraft as in degrees per second, which is the angle $\theta$ between tracks T1 and T2, divided by the elapsed time for the aircraft to make the turn between points P1 and P2. Computer 70 multiplies each of parameters AOI, CDI and ROT by preselected or programmable respective factors and sums the results for composite signal prompts 41 and 51, as displayed on lightbars 40 and 50, each indicating a relative direction and degree of corrective action required by the pilot to realign the aircraft's track T with lane L.

Referring back to FIG. 1, sensors 74 monitor the aircraft's hopper or dispensing system and permit computer 70 to record the actual track and time of each dispersal. The aggregate application pattern can be displayed while the mission is in progress, or retrieved later for verification.

Referring again to FIG. 1, the computer 70 supplies an autopilot signal output 75 equivalent to the "flight director" visual prompt, for automated aileron control during lane passage, and audible voice prompts via audio output 77, which include the words "left" and "right" when appropriate, corresponding to the general meaning of the lightbar indications, and providing no audio prompt when the alignment is being closely maintained.

Referring to FIGS. 1, 4 and 6, alphanumeric information 60 is presented below the lightbars 40 and 50, providing corresponding or additional information to the pilot.

Figure 7A:
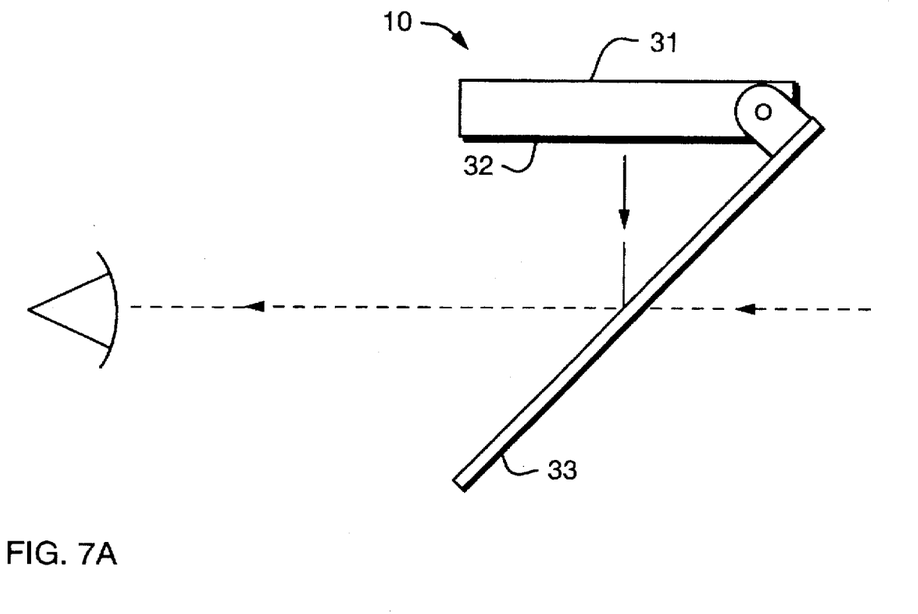
Figure 7B:
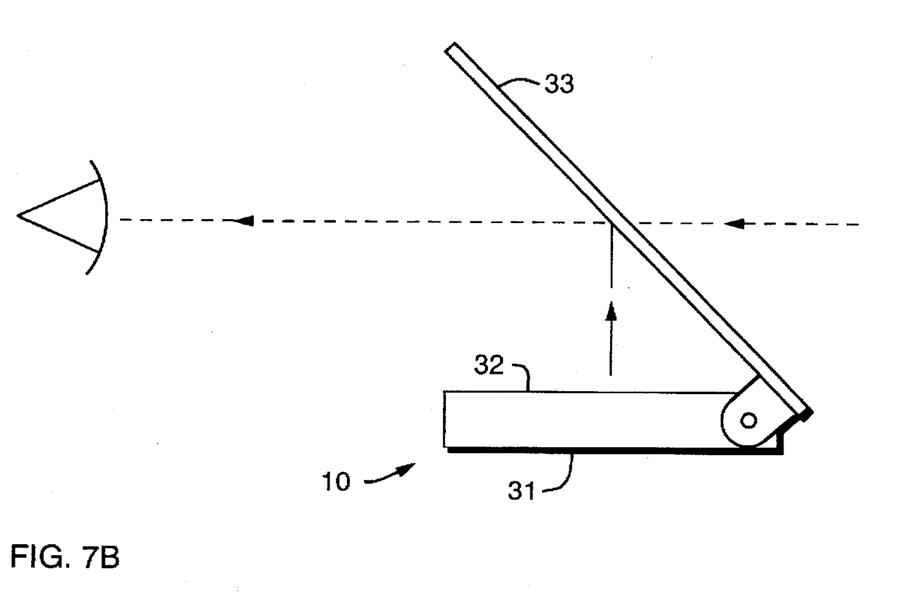

Referring now to FIG. 7, indicator 10 is configured in the form of a heads up display with base 31 containing the light source 32. The base 31 may be mounted with a beam-splitter 33 folding either upward or downward into the pilot's line of sight. The beam-splitter 33 is arranged to reflect the signal pattern being radiated by the light source 32 towards the pilot's eyes. At the same time, the pilot is able to see through the beam-splitter 33 and out of the aircraft. The optics have a red filter and are treated with a non-reflective coating, and other surfaces of the light source are finished in flat black so as to be invisible in the display.

The objects and advantages of the invention may be further realized and attained by means of the instrumentalities and combinations particularly pointed out in the appended claims. Accordingly, the drawings and description are to be regarded as illustrative in nature, and not as restrictive.

I claim:

1. An onboard, lane guidance navigation system for acquiring and maintaining alignment of the track of a piloted vehicle with a line segment on a surface, said system comprising at least one antenna and receiver for receiving navigation signals, data sufficient to locate said line segment, a computer for continuously resolving navigation parameters and generating navigation signals, and a visual indicator located within said pilot's normal field of forward outside vision, said indicator comprising a horizontal lightbar, said lightbar illuminatable alternatively to left and right of a centerpoint in such direction and in such length as controlled by said navigation signals, said navigation parameters comprising the angle of intercept between said line segment and said track, the perpendicular distance of said vehicle from said line segment, and the rate of turn of said vehicle over the plane of said surface, said navigation signals comprising the sum of each of said navigation parameters as factored by a respective index, said sum being displayed on said indicator and there representing a pilot instruction for imparting corrective control action to said vehicle for said acquiring and maintaining alignment of said track and said line segment which said instruction said pilot is able to see and respond to without looking away from said normal field of forward outside vision.

2. An onboard, lane guidance navigation system for acquiring and maintaining alignment of the track of a piloted vehicle with a line segment on a surface, said system comprising a least one antenna and receiver for receiving navigation signals, data sufficient to locate said line segment, a computer for continuously resolving navigation parameters and generating navigation signals, and a visual indicator located within said pilot's normal field of forward outside vision, said indicator comprising a horizontal upper lightbar and a horizontal lower lightbar, each said lightbar comprising a row of discrete light sources and having a visually identifiable centerpoint, said light sources individually illuminatable as controlled by said navigation signals, said navigation parameters comprising the relative locations of said line segment with respect to said vehicle and said track of said vehicle, said navigation signals comprising indications of lateral displacement from said line segment of a first point extended rearward of said vehicle being presented on said lower lightbar of said indicator and lateral displacement from said line segment of a second point extending forward of said vehicle being represented on said upper lightbar of said indicator, thereby simulating actual flagmen marking the ends of said line segment, said indications of said lateral displacements of said points representing a pilot instruction for imparting corrective control action to said vehicle for said acquiring and maintaining alignment of said track and said line segment, which said instruction said pilot is able to see and respond to without looking away from said normal field of forward outside vision.

3. The lane guidance navigation system of claim 2, said navigation parameters further comprising the angle of intercept between said line segment and said track, the perpendicular distance of said vehicle from said line segment and the rate of turn of said vehicle in the plane of said surface, said navigation signals further comprising the sum of each of said angle of intercept between said line segment and said track, said perpendicular distance of said vehicle from said line segment, and said rate of turn of said vehicle in the plane of said surface, each as factored by a respective index, said lightbar illuminatable alternatively to left and right of a centerpoint in such direction and in such length as controlled by said navigation signals, said sum being displayable on said indicator and there representing a pilot instruction for imparting corrective control action to said vehicle for said acquiring and maintaining alignment of said track and said line segment which said instruction said pilot is able to see and respond to without looking away from said normal field of forward outside vision, the choice between presentation on said indicator of said lateral displacement and said sum being pilot-selectable.

4. The lane guidance navigation system of claim 3, said navigation signals being further directed to an autopilot for automated lateral control of said vehicle for said alignment.

5. The lane guidance navigation system of claim 3, each of said lightbars presenting independently factored said sums of said navigation signals whereby said user may tailor said presentation on said indicator for different upper and lower said sums.

6. The lane guidance navigation system of claim 3, said indicator comprising a heads up display whereby said navigation signals are superimposed on a transparent image splitter within said pilot's said normal field of forward outside vision.

7. The lane guidance navigation system of claim 3, said indicator further comprising at least one row of alphanumeric character capability.

8. The lane guidance navigation system of claim 3, said vehicle being an airborne vehicle.

9. The lane guidance navigation system of claim 3, said vehicle being a land-based vehicle.

10. The lane guidance navigation system of claim 3, said vehicle being a sea-borne vehicle.

11. The lane guidance navigation system of claim 3, said system further comprising means for generating audible said navigation signals as supplemental said pilot instructions.

12. The lane guidance navigation system of claim 3, said audible said navigation signals comprising word prompts.

13. A method for prompting a pilot to make necessary control actions to a vehicle to acquire and maintain alignment of the track of said vehicle with a line segment on a surface, comprising the steps of:

receiving navigation reference signals by means of an antenna and receiver, having on hand data sufficient to locate said line segment, resolving navigation parameters and generating navigation signals by means of a navigation computer and control panel, presenting said navigation signals to said pilot on a visual indicator located within said pilot's normal field of forward outside vision, said indicator comprising a horizontal upper lightbar and a horizontal lower lightbar, each said lightbar comprising a row of discrete light sources and having a visually identifiable centerpoint, said light sources individually illuminatable as controlled by said navigation signals, said navigation parameters comprising the relative locations of said line segment with respect to said vehicle and said track of said vehicle, said navigation signals comprising indications of lateral displacement from said line segment of a first point extended rearward of said vehicle being presented on said lower bar of said indicator and lateral displacement from said line segment of a second point extending forward of said vehicle being represented on said upper bar of said indicator, thereby simulating actual flagmen marking the ends of said line segment, said indications of said lateral displacements of said points representing a pilot instruction for imparting corrective control action to said vehicle for said acquiring and maintaining alignment of said track and said line segment, which said instruction said pilot is able to see and respond to without looking away from said normal field of forward outside vision, said navigation parameters further comprising the angle of intercept between said line segment and said track, the perpendicular distance of said vehicle from said line segment, and the rate of turn of said vehicle over the plane of said surface, said navigation signals further comprising the sum of each of said angle of intercept between said line segment and said track, said perpendicular distance of said vehicle from said line segment, and said rate of turn of said vehicle in the plane of said surface as factored by a respective index, each said lightbar of said indicator being illuminatable alternatively to left and right of said centerpoint in such direction and in such length as controlled by respective said navigation signals, said sum being presented on said indicator such that said pilot is able to continuously monitor and respond to said signals with said necessary control actions for said acquiring and maintaining alignment of said track and said line segment without looking away from said normal field of forward outside vision, the choice between presentation on said indicator of said lateral displacement and said sum being pilot-selectable.

14. The method of claim 13 comprising the further step:

presenting said navigation signals in an audible form as supplemental said pilot instructions.

15. The method of claim 13, each of said lightbars presenting independently factored said sums of said navigation signals whereby said user is able to tailor said presentation on said indicator for different upper and lower said sums.

16. The method of claim 13, said indicator comprising a heads up display whereby said navigation signals are superimposed on a transparent image splitter within said pilot's said normal field of forward outside vision.

17. The method of claim 13, said indicator further comprising at least one row of alphanumeric character capability.

18. The method of claim 13, said vehicle being an airborne vehicle.

19. The method of claim 13, said vehicle being a land-based vehicle.

20. The method of claim 13, said vehicle being a seaborne vehicle.

* * * * *